United States Patent
Schnaars et al.

(10) Patent No.: US 9,528,566 B2
(45) Date of Patent: Dec. 27, 2016

(54) HYDRAULICALLY DAMPING BUSH BEARING

(71) Applicants: ZF Friedrichshafen AG, Friedrichshafen (DE); Audi AG, Ingolstadt (DE)

(72) Inventors: Wolfgang Schnaars, Osnabrueck (DE); Thomas Conrad, Treuchtlingen (DE)

(73) Assignees: AUDI AG, Ingolstadt (DE); BOGE ELASTMETALL GMBH, Damme (DE)

( * ) Notice: Subject to any disclaimer, the term of this patent is extended or adjusted under 35 U.S.C. 154(b) by 0 days.

(21) Appl. No.: 14/418,792

(22) PCT Filed: Jul. 1, 2013

(86) PCT No.: PCT/EP2013/063798
§ 371 (c)(1),
(2) Date: Jan. 30, 2015

(87) PCT Pub. No.: WO2014/019784
PCT Pub. Date: Feb. 6, 2014

(65) Prior Publication Data
US 2015/0211598 A1 Jul. 30, 2015

(30) Foreign Application Priority Data
Jul. 31, 2012 (DE) ........................ 10 2012 213 446

(51) Int. Cl.
*F16F 13/16* (2006.01)
*F16F 13/18* (2006.01)
*F16F 13/14* (2006.01)
(52) U.S. Cl.
CPC ............ *F16F 13/16* (2013.01); *F16F 13/1418* (2013.01); *F16F 13/18* (2013.01)

(58) Field of Classification Search
CPC ............ F16F 13/14; F16F 13/16; F16F 13/18; F16F 13/1418
(Continued)

(56) References Cited

U.S. PATENT DOCUMENTS 4,861,005 A * 8/1989 Bausch ................... F16F 13/28
267/140.12
5,172,893 A 12/1992 Bouhier et al.
(Continued)

FOREIGN PATENT DOCUMENTS

DE 39 09 852 A1 3/1990
DE 4117129 A1 11/1992
(Continued)

OTHER PUBLICATIONS

Translation JP 6-103056 B2, Dec. 1994.*
(Continued)

*Primary Examiner* — Thomas J Williams
(74) *Attorney, Agent, or Firm* — Cohen & Hildebrand, PLLC

(57) ABSTRACT

A hydraulically damping bush bearing has an elongated inner part, and outer bush, an elastomeric damping member disposed between the inner part and outer bush and a pair of axial chambers offset from one another in an axial direction. The axial chambers communicate with one another via at least one axial channel. The bush bearing also has a pair of radial chambers that communicate via at least one radial channel. The radial chambers are disposed between the pair of axial chambers and are offset from each other in a circumferential direction. One of the pair of axial chambers has at least two separated first axial chambers spaced at a distance from one another in the circumferential direction.

12 Claims, 4 Drawing Sheets

(58) Field of Classification Search
USPC ............. 267/140.11, 140.12, 140.13, 141.3, 267/141.6, 35, 256
See application file for complete search history.

(56) References Cited

U.S. PATENT DOCUMENTS

| | | | |
|---|---|---|---|
| 5,178,376 A * | 1/1993 | Hamaekers | F16F 13/1418 267/140.11 |
| 6,029,961 A | 2/2000 | Meyerink et al. | |
| 6,386,529 B2 | 5/2002 | Bik et al. | |
| 6,561,501 B2 | 5/2003 | Bouhier et al. | |
| 2002/0011701 A1 | 1/2002 | Bik et al. | |
| 2002/0079628 A1 | 6/2002 | Breitfeld et al. | |
| 2003/0201590 A1 | 10/2003 | Thornhill | |
| 2006/0081427 A1* | 4/2006 | Gautier | F16F 13/1418 188/267 |
| 2015/0226285 A1* | 8/2015 | Schnaars | F16F 13/10 267/140.13 |

FOREIGN PATENT DOCUMENTS

| | | | |
|---|---|---|---|
| DE | 103 59 340 A1 | 7/2005 | |
| EP | 0452169 A1 | 10/1991 | |
| EP | 0754877 A1 * | 1/1997 | ............ F16D 13/16 |
| GB | 2351138 A | 12/2000 | |
| JP | 06 027638 A1 | 7/1994 | |
| JP | 06103056 B2 * | 12/1994 | ............ F16F 13/14 |
| JP | 2000 104774 A1 | 4/2000 | |

OTHER PUBLICATIONS

International Search Report for PCT/EP2013/063798, dated Oct. 17, 2013.

Co-pending, co-owned, U.S. Appl. No. 14/418,826, filed Jan. 30, 2015.

* cited by examiner

HYDRAULICALLY DAMPING BUSH BEARING

FIELD OF THE INVENTION

Background of the Invention

A hydraulically damping bush bearing of this type is known from DE 103 59 340 A1 and also has a pair of axial chambers with at least two axial chambers arranged offset from one another in the axial direction of the inner part and communicating with one another via at least one axial chamber channel. Moreover, a pair of radial chambers with at least two radial chambers, communicating via at least one radial channel, which are arranged between the axial chambers and offset in the circumferential direction of the inner part, is provided. In generic bush bearings, the inner part generally has a hole for receiving an axle pin of a machine element or component to be mounted.

Generic hydraulically damping bush bearings are used mainly in automotive engineering to mount parts of the wheel suspension or drive assemblies of vehicles. In addition to elastic damping elements, which are typically made from an elastomer, the hydraulically damping bush bearing comprises chambers for receiving a hydraulic damping fluid that supports damping. To utilise the dissipating effect caused by the weight of liquid, chambers are provided in the elastomeric insert parts or rubber bodies of the hydraulically damping bush bearings to receive a fluid damping agent. The exact size and position of the chambers depends on the intended use of the hydraulically damping bearing, more particularly the respective desired dissipating effects in an axial, i.e. longitudinal direction of the inner part and a direction at right angles thereto, i.e. radial direction. The oscillation characteristics of the component to be mounted are also important as well as the dead weight of the damping mass to be mounted. In any case, the chambers are typically interconnected by one or more channels. Depending on the stress on the bearing, the hydraulic damping agent can thus be pressed from one chamber into another. Both bearings in which the hydraulic damping is used in respect to forces introduced radially into the bush bearing and bearings in which mainly the damping is supported by the damping fluid are known in this connection. The prior art referred to above is evidence of a bush bearing in which the amortising effect is utilised in both an axial and a radial direction.

It has been shown, however, that when generic hydraulically damping bush bearings are exposed to higher frequency oscillations, more particularly oscillations ranging between 50 Hz and 150 Hz, in particular >250 Hz, of the component to be mounted in a damping manner, unintentionally high damping occurs and thus hardening. The required damping by means of the hydraulically damping bush bearing is no longer guaranteed in the desired manner at said higher frequencies.

SUMMARY OF THE INVENTION

The present invention is based on the problem of providing a hydraulically damping bush bearing, which also demonstrates good damping at higher frequencies. The present invention intends to provide a hydraulically damping bush bearing, which does not create unintentionally high damping in a radial direction at higher frequencies. The hydraulic damping bearing is intended to prevent the hardening step observed in the prior art at higher frequencies above approx. 250 Hz, and more particularly in the case of radial damping.

To solve the above-mentioned problem, the present invention suggests a hydraulically damping bush bearing with the features discussed herein.

The hydraulically damping bush bearing has an elongated inner part as is known. Said elongated inner part has a hole running along the longitudinal axis which can also be configured as a blind hole, i.e. not continuous. The hole generally runs in the longitudinal direction of the elongated inner part, which is shaped as a sleeve. To one side, said inner part typically towers above said stop plate, which is used to mount the engine element or component to be damped. Typically, an axial chamber configured continuously in a circumferential direction is also located on said connection side, which chamber communicates with an axial compensating chamber on another side of the bush bearing via at least one axial channel.

Moreover, the hydraulically damping bush bearing preferably comprises additional elements, which perform different functions. If there are two radial chambers, only two additional elements can be provided. The additional elements extend firstly along indentations formed by the elastomeric damping member for the radial chambers and form corresponding lateral faces for said radial chambers. The additional elements are typically supported in a radially outward direction on a bush bordering the bush bearing at the outer circumference and serve as a radial stop, which prevents excessive radial oscillation of the bush bearing with the displacement of the damping fluid provided in both radial chambers. Moreover, the additional elements generally form the aforesaid radial and axial channels between the outer peripheral surface of the additional elements and the inner peripheral surface of the bush. Depending on the tuning of the frequency position for the damping maximum, the channels can be long, short broad or narrow. An axial channel connects the at least two axial chambers of the pair of axial chambers. The axial channel (s) does not typically extend strictly in an axial direction, but also run in a circumferential direction. Furthermore, said additional elements form the at least one radial channel which connects the radial chambers to one another. Said radial channel is typically configured in the additional elements as running solely in the circumferential direction. Several additional elements generally constitute a cylindrical component in a fitted together state, the outer peripheral surface of which is provided with the recesses forming the radial and axial channels. The axial extension of the additional elements is at the level of the radial chambers, i.e. where the additional elements engage with the indentations formed by the elastomeric damping member, lower than between said radial chambers. The additional elements typically extend in an axial direction between the radial chambers from the aforesaid axial compensating chamber more or less to the other axial chamber.

According to the invention, at least on one side of the radial chambers, the axial chamber provided there is subdivided. A plurality of separated, first axial chambers spaced at a distance from one another are located on said one side. Thus, the damping fluid on said one side, which typically is opposite the connection side, cannot circulate freely in the axial chamber. In fact, a plurality of first axial chambers formed as annular segments are provided in a circumferential direction, which restrict the radial movement of the damping fluid. The individual first axial chambers are typically each connected to the axial chamber on the other side that generally runs right around the circumference via an individual axial channel. This other side is typically the connection side, i.e. the side via which a load to be supported axially and damped of a component to be mounted is introduced into the hydraulically damping bush bearing. The axial chambers can also be configured as sub-divided in a circumferential direction on the connection side. Thus, an annular segment shaped axial chamber on the connection side can be assigned to each annular segment on the one side, wherein an axial channel only connects annular segment shaped chambers assigned to one another on the connection and the other side.

Tests by the applicant have shown that the embodiment of a plurality of axial compensating chambers on the first side can improve the damping characteristics of the hydraulically damping bush bearing, more particularly at frequencies ranging between 50 and 250 Hz. Unintentionally high damping, more particularly in radial loading, are prevented.

According to a preferred further embodiment of the embodiment as per the invention, the first axial chambers spaced apart from one another in a circumferential direction are separated from one another by a partition formed from the elastomeric damping member. Said partition typically has the contour of the first axial chambers in a transverse direction. It is assumed in particular here that the first axial chambers are formed by a counter-diaphragm, which is arranged typically at the end of the bush. Specifically and preferably, the counter-diaphragm forms an annular passage running in a circumferential direction, which is configured with a constant cross-section in the circumferential direction. The partition formed by the elastomeric damping member has a contour corresponding to said cross-section and extends into the annular channel such that the inner surface of the annular channel rests on the outer surface of the partition in an initial state thus dividing and separating the first axial chambers from one another. In the event of excessive axial bearing pressure, where the damping fluid is displaced from the axial chambers provided on the connection side to the compensating side, the counter-diaphragm may, however, lift away from the partition thus removing the separation. However, in the initial state, which is dependent on the pretension of the hydraulically damping bush bearing, the counter-diaphragm rests against the partition.

According to a further embodiment of the bush bearing as per the invention, at least one fluid-free damping chamber is provided between the axial chambers offset from one another in the axial direction, which separates the radial and axial chambers from one another. The axial chambers arranged offset from one another in an axial direction are typically firstly the damping chamber provided on the connection side and secondly, the axial compensating chamber provided typically on the opposite end of the bush bearing. The fluid-free damping chamber is filled with a gas, more particularly air. The fluid-free damping chamber is typically sealed and consequently if the damping chamber is compressed, the contents of the chamber are compressed and not expelled from the chamber. The fluid-free damping chamber is thus able to absorb, in particular higher axial load frequencies, by compressing the medium, generally a gas, which is introduced into the fluid-free damping chamber. Thus, the hydraulic bush bearing as per the invention is relatively soft even in the case of radial oscillations with higher frequencies above 250 Hz. Unwanted high damping does not occur.

The fluid-free damping chamber is configured preferably continuously in a circumferential direction and consequently the fluid contained in this chamber can move freely in a circumferential direction in the event of a compensating movement. As a rule, this applies in the case of a radial stimulus. This is where the greatest effect occurs.

In the case of a compact further embodiment, the fluid-free damping chamber is formed partly by the elastomeric damping member and partly by walls of an intermediate diaphragm element attached to the elastomeric damping member. Said intermediate diaphragm element typically separates the fluid-free damping chamber from an axial chamber mounted upstream axially on one side that is generally directly adjacent thereto. More particularly, this is the fluid or pump chamber arranged axially on the connection side. In other words, the fluid-free damping chamber is generally arranged on the connection side of the elastomeric damping member.

The intermediate diaphragm element preferably has the task of sealing up and surrounding the fluid-free chamber. The intermediate diaphragm element typically has a support ring on the inner peripheral surface thereof for this purpose, which rests against the outer peripheral surface of the inner part. On the outer circumference of the intermediate diaphragm element, the intermediate diaphragm element is reinforced preferably by an annular disc. Both the annular disc and the support ring are made from a hard material, such as a thermoplastic or metal, and consequently they deform slightly at the very most when the intermediate diaphragm element is pressed into an annular passage between the bush and the inner part. The annular disc is configured typically as a core and encased in an elastomeric material which is also vulcanised onto the outer peripheral surface of the support ring.

In a preferred manner directly adjacent to the outer peripheral surface of the support ring, the intermediate diaphragm element preferably forms an annular chamber segment, which forms an annular chamber of the fluid-free damping chamber. Moreover, as per a preferred further embodiment of the following invention, the intermediate diaphragm element forms a sealing segment which can be placed onto the elastomeric damping member in a sealing manner. Said sealing segment typically rests against the elastomeric sealing member where said member is reinforced by the aforementioned separator. In other words, the elastomeric damping member has a reinforcing element in the attachment region to the sealing surface formed by the sealing segment, which reinforcing element reinforces the elastomeric damping member, more particularly in an axial direction, wherein said reinforcing element is typically formed by the separator.

With a view to obtaining a good seal, the intermediate diaphragm element is preferably configured such that an inner annular wall section of the annular chamber segment can be pushed onto the inner part and can be fixed in an axial direction relative to the inner part such that, in an untensioned initial state, the sealing segment projects in an offset manner relative to a front end of the annular wall section in the direction of the elastomeric damping member. If it is assumed for reasons of simplicity that the inner part forms an annular contact surface for axial fixing of the inner annular wall section, which contact surface is level with the attachment region formed by the elastomeric damping member for the sealing segment, then in an untensioned state of the intermediate diaphragm element, the sealing surface projects above the front end of the inner annular wall section resting against the annular surface. If the intermediate diaphragm element is fitted now, the sealing segment first rests on the attachment region of the elastomeric damping member. When the intermediate diaphragm element is pushed forward in an axial direction into the final installation position predetermined radially by the annular surface of the inner part, the elastomeric material of the intermediate diaphragm element stores the axial tension between the intermediate diaphragm elements produced in the process, which pushes the sealing segment against the elastomeric damping member. This action increases the tightness between the intermediate diaphragm element and the elastomeric damping member and consequently the axial chamber provided on the other side of the intermediate diaphragm element can extend in a radial direction beyond the damping member and the sealing segment does not necessarily have to be provided between the elastomeric damping member and an element provided on the end side for exerting axial pressure on the radial outer surface of the intermediate diaphragm element. The axial chamber delimited by the intermediate diaphragm element can extend further outwards in a radial manner in this embodiment.

With a view to restricting movement in a radial direction, more particularly universal displacement, by compressing the fluid-free damping chamber, a stop element arranged in the fluid-free damping chamber is suggested as per a preferred further embodiment. Generally, at least two stop elements are implemented, which are opposite one another in a radial direction. The stop element is preferably connected to the intermediate diaphragm element here and interacts with the elastomeric damping member. Consequently, a cushioned and soft stopping action can be achieved through the material properties of the elastomeric damping member, whereas the stop element itself can be made of a hard material, such as a standard thermoplastic, for example.

The stop element is produced preferably as a separate component and connected to a core of the intermediate diaphragm element. This core is more particularly the aforementioned annular disc of the intermediate diaphragm element which can be made from a harder material. The stop element and/or core can be made from plastic, wherein at least one of the elements, in the case of a two-part configuration, has one or more pins formed thereon as an integral piece for connecting both parts.

Further details and advantages of the following invention are provided in the description below of an exemplary embodiment in connection with the drawings.

DETAILED DESCRIPTION OF THE INVENTION

Figure 1:
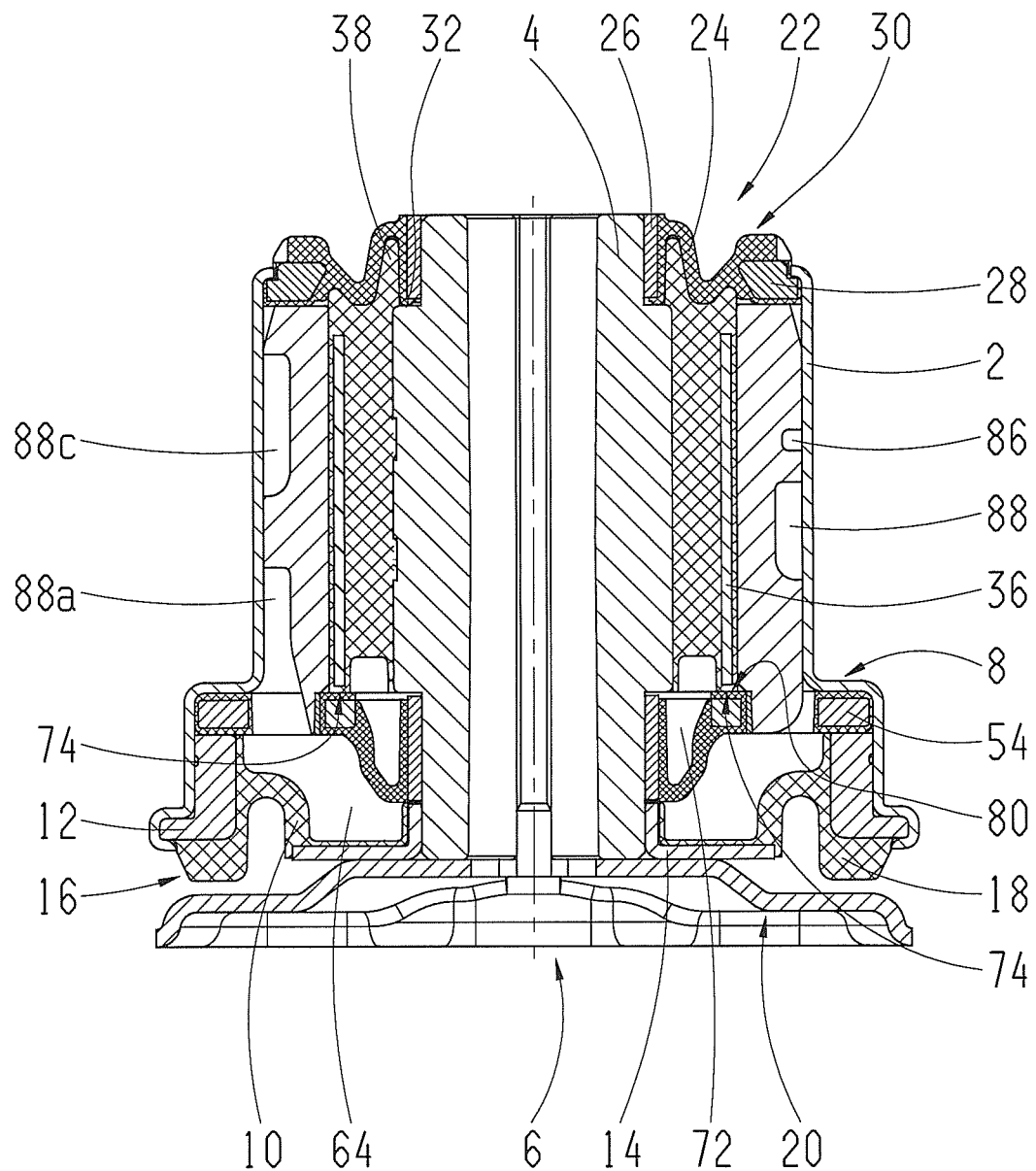
FIG. 1 shows a longitudinal view of the exemplary embodiment.

The figures show an exemplary embodiment of a hydraulically damping bush bearing with a bush (reference sign 2), which is arranged concentrically to an inner part 4, which passes through the bush 2. The bush 2 has a larger diameter on a connection side (reference sign 6) and essentially forms two cylinder sections, which are connected to one another by means of an abutment shoulder 8. The connection side of the bush 2 with the larger diameter includes an axial bearing diaphragm (reference sign 10), which is reinforced by a retaining ring 12 on the outer circumference thereof and by a support lug 14 on the inner circumference thereof. The retaining ring 12 and the support lug 14 are connected to the elastomeric material forming the bearing diaphragm 10 by vulcanisation. The single-piece bearing diaphragm element 16 formed in this way is pressed into the annular passage between the bush 2 and the inner part 4. The bush 2 is also flattened down on the stop side thereof and overlaps the retaining ring 12. Within this flattened down region, the bearing diaphragm 10 forms a bump stop 18 on each of the opposite peripheral sections, over which an axial stop plate 20 projects, which is assigned to the inner part 4 and connected thereto, and which acts in an axial manner on the underside of the bush bearing. The axial stop plate 20 rests on an annular section of the support lug 14 extending in a radial direction.

On the top side (reference sign 22) opposite the stop connection side 6, the bush 2 is covered by an axial counter diaphragm 24, which, like the previously described bearing diaphragm 10, is annular in shape and is reinforced radially inwards by a support ring 26 and radially outwards by a retaining ring 28. Also located on said top side 22 is an integrative counter diaphragm element formed by vulcanisation and connection of support ring 26, retaining ring 28 and axial counter diaphragm 24, which element forms an upper axial bump stop 30 which is pressed in a radial direction into the annular passage between the bush 2 and the inner part 4. The inner part 4 forms a counter diaphragm abutment shoulder 32 against which the elastomeric material of the counter diaphragm 24 rests in a sealing manner under the pressure of the support ring 26 pressed onto the inner part 4.

An elastomeric damping member 34 is provided axially within the upper axial bump stop 30 and surrounding the inner part 4, which damping member is formed from an elastomeric material and into which a separator 36 formed from a sheet metal material is vulcanised and forms radial chamber walls 35. Said separator 36 extends substantially over the entire axial reach of the elastomeric damping member 34. As can be seen particularly in FIG. 2, the separator 36 reinforces a contact surface formed by the elastomeric damping member 34 for attaching the counter member element 30 at the level of the retaining ring 24, which is fixed in an axial direction by a flattened down area of the bush. This produces a solid seal between the elastomeric damping member 34 and the counter diaphragm element 30. Moreover, on this side, the elastomeric damping member forms partitions (reference sign 38) in a radial direction on opposing sides, the contour of which partitions corresponds to the contour of an annular channel 40 formed by the counter diaphragm (see FIG. 1, FIG. 3). Thus, the annular channel 40 is divided in the circumferential direction into two first axial chambers 42 that are substantially the same size, which are identified as separate axial chambers 42a, 42b in FIG. 2. Said axial chambers 42a,b extend in the circumferential direction at an angle of approximately 160 degrees.

The annular channel 40 communicates with a recess 44 formed on the front end of the elastomeric damping member, which recess, like the annular channel 40, is divided into peripheral sections by the partition 38. The recess sections separated from one another in a circumferential direction belong to the two first axial chambers 42a, 42b.

A corresponding recess 46 is moulded on the opposite front end of the elastomeric damping member 34. Said recess 46 is covered by an intermediate diaphragm element (reference sign 48) which comprises an intermediate diaphragm 50 extending substantially in a radial direction, an intermediate diaphragm support ring 52, an annular disc 50 forming a core of the intermediate diaphragm element 48 as well as stop elements (reference sign 56), which are opposite each other in a radial direction (see FIG. 2). To form the intermediate diaphragm element, firstly the intermediate diaphragm support ring 52 and the annular disc 54 are surrounded with elastomeric material, wherein a contact surface is left open for the stop elements 56. The annular disc 54 is positioned in a moulding tool using spacer cams 60, which are formed as a single-piece on the annular disc 54 in radially opposing regions (see FIG. 2). The intermediate diaphragm 50 is formed after the vulcanisation of the elastomeric material. The stop elements 56 are then connected to the annular disc by means of the pins 58. In an assembled state (see FIG. 2), the stops 56 project into the recess 46.

On the outer circumference thereof, the intermediate diaphragm element 48 is clamped between an inner annular surface 62 of the bush 2 formed by the abutment shoulder 8 and a front end on the outer circumference of the bearing diaphragm element 16. The axial reach of the retaining ring 12 is reduced at the level of the spacer cams 60 and consequently said retaining ring is surrounded there by the elastomeric material of the bearing diaphragm 10 (see FIG. 2). Otherwise, the retaining ring 12 extends axially in a circumferential direction to the inner front end of the bearing diaphragm element 16. The retaining ring 12 clamps the annular disc 54 surrounded by elastomeric material between itself and the inner annular surface 62 in a sealing manner. Thus on the outer side of the intermediate diaphragm element 48, an axial chamber 64 acting as a pump chamber is formed and closed in a sealing manner between the intermediate diaphragm element 48 and the bearing diaphragm element 16.

Between the intermediate diaphragm support ring 52 and the inner edge of the annular disc 54, the intermediate diaphragm element 48 forms an annular chamber segment 66, which projects over a connection-side front end 68 formed by the inner part 4, in an axial direction and towards the axial chamber 64 and encloses an annular chamber 70 which communicates with the recess 64. A fluid-free damping chamber 72 is formed as a result, which is formed in a circular manner in the circumferential direction. Said fluid-free damping chamber 72 is sealed in an airtight manner. For this purpose, the intermediate diaphragm element 48 with the elastomeric casing of the annular disc 54 rests against an attachment region (reference sign 74) of the elastomeric damping member 34, which is reinforced in an axial direction by the separator 36 as a reinforcing element. The sealing is performed radially inwards by the intermediate diaphragm support ring 52 pressed against the inner part 4, which clamps the elastomeric material of the intermediate diaphragm element 48 in a sealing manner between itself and the connection-side front end 68. The intermediate diaphragm support ring 52 thereby forms an inner annular wall section 76 with the elastomeric material of the intermediate diaphragm 50 vulcanised thereon, which annular wall section is pushed and pressed onto the inner part 4 here and fixed in an axial direction by attachment onto the connection-side front end 68 opposite the inner part 4.

The intermediate diaphragm 50 is thus formed such that in an assembled state, a sealing segment 78 of the intermediate diaphragm element 48 formed essentially by the annular disc 54 and the elastomeric casing thereof rests against the attachment region 74 under pretension. If the intermediate diaphragm element shown in the exemplary embodiment were provided as such, due to the design of the intermediate diaphragm 50, the sealing segment 78 would project over the front end of the annular wall section 76 abutting the connection-side front end 68 in an assembled state, i.e. would project in an offset manner. Said offset is eliminated entirely when the intermediate diaphragm element 48 is fitted under elastic pretension of the flexible walls of the annular chamber segment 66, and consequently the front end of the annular wall section 76 is arranged at more or less the same level as a sealing surface 80 formed by the annular segment 78 and interacting with the attachment region 74 of the elastomeric damping member 34. This axial pretensioning of the intermediate diaphragm element 48 improves the tightness between said element 48 and the elastomeric damping member 34.

Figure 2:
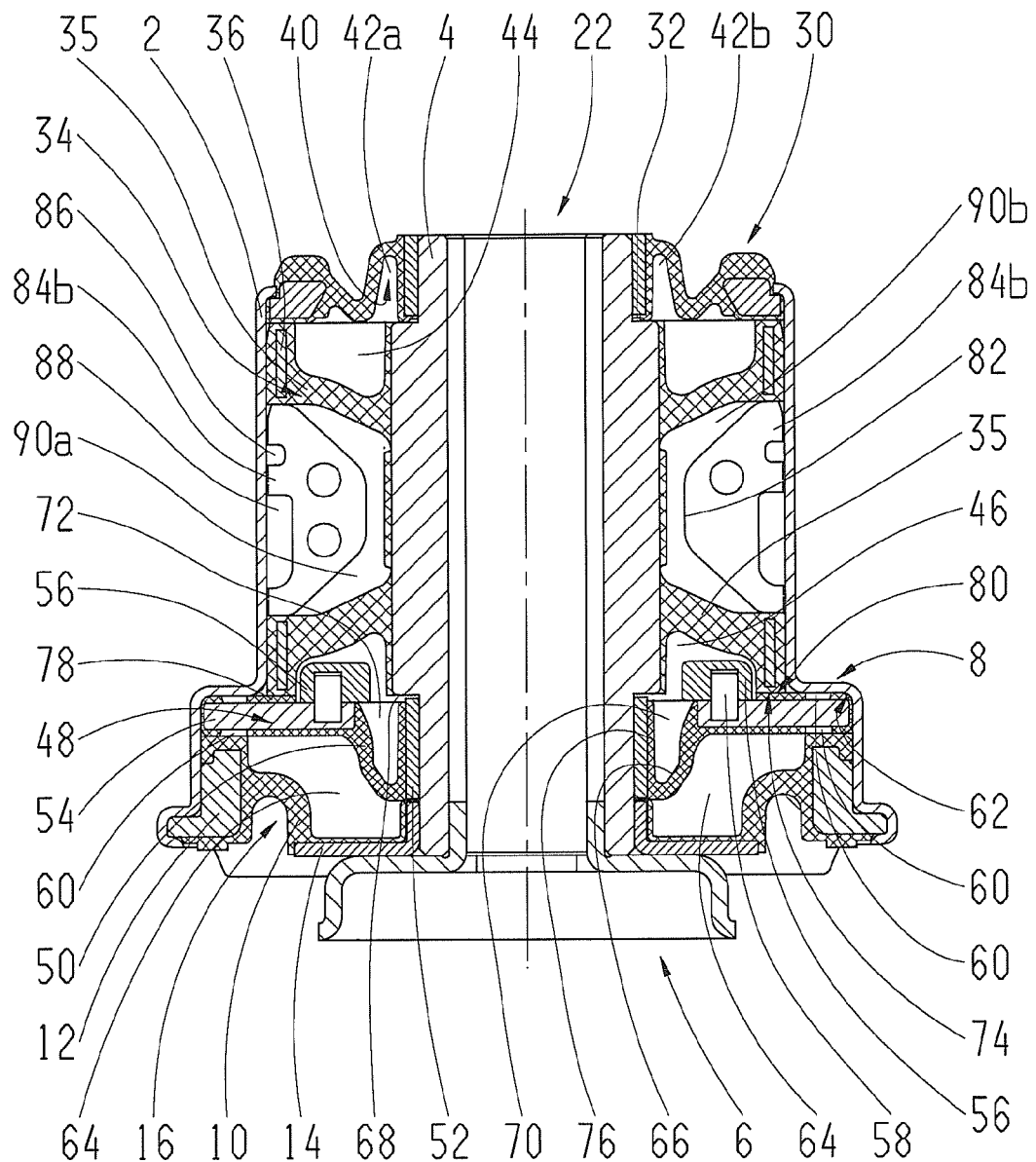
FIG. 2 shows a further longitudinal view of the exemplary embodiment, which is offset 90 degrees compared with FIG. 1.
Figure 3:
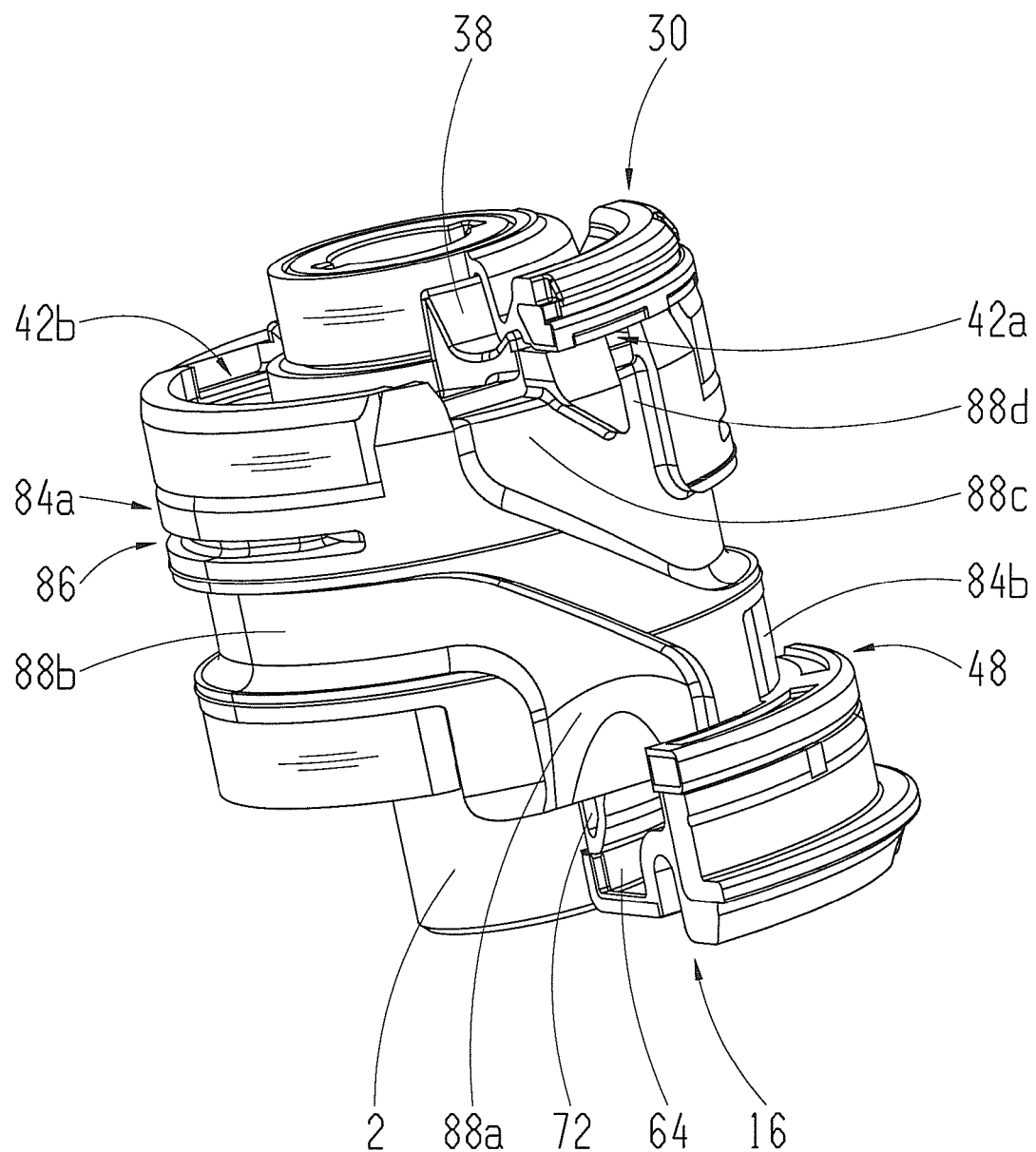
FIG. 3 shows a perspective, partially cropped view of the exemplary embodiment without the bush.
Figure 4:
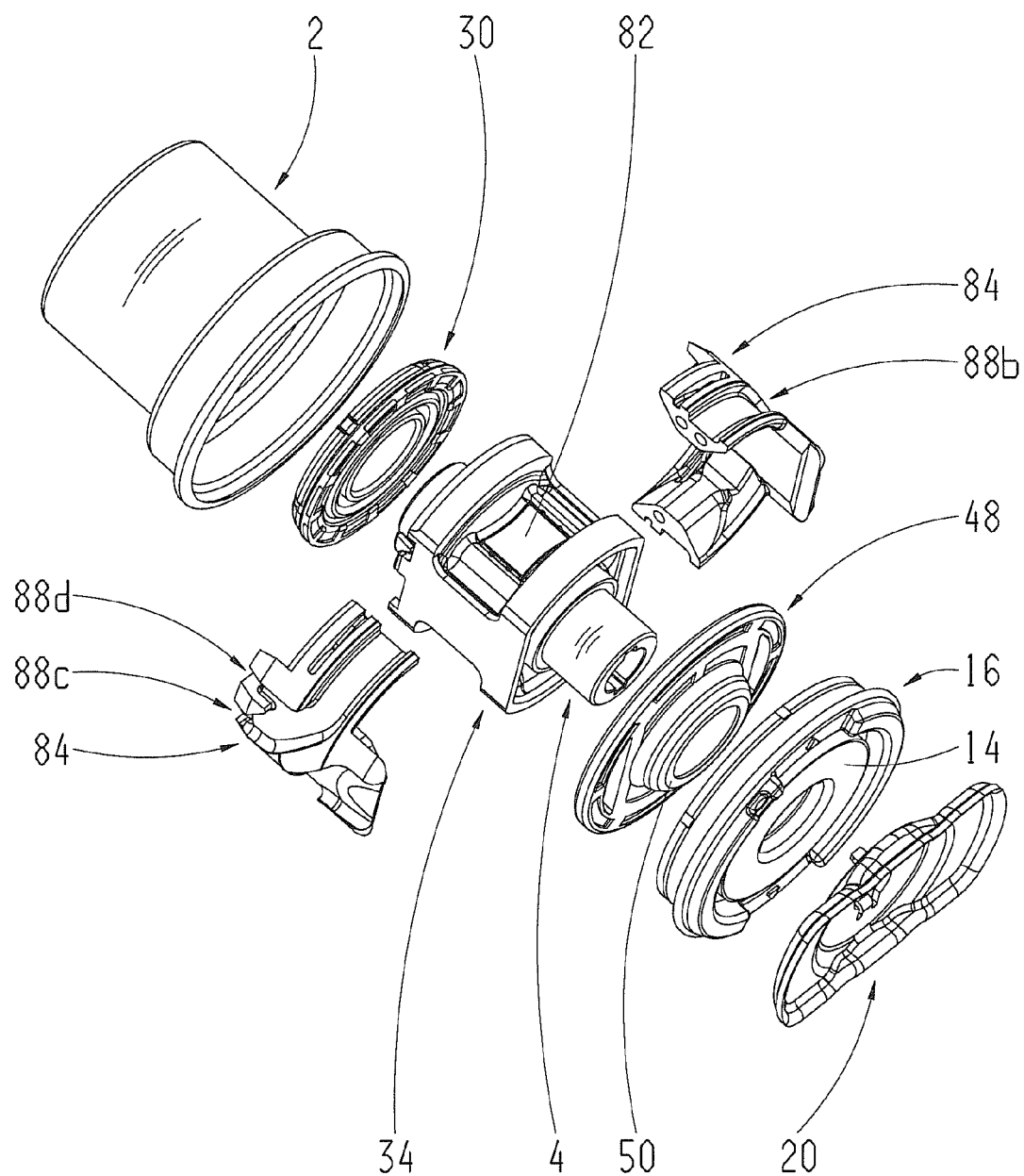
FIG. 4 shows a perspective exploded view of the exemplary embodiment.

As can be seen in FIGS. 2 and 3, the elastomeric damping member 34 forms radially opposing radial stop contours 82 on opposing peripheral sections, in which contours additional elements (reference sign 84) are located which are made from thermoplastic. The exemplary embodiment shown has two additional elements 84*a*, 84*b*, which are each formed in the manner of a half ring and fitted together in the sectional plane shown in FIG. 2. The additional elements 84 rest against the inner peripheral surface of the bush 2 in a sealing manner and enclose a radial channel (reference sign 86) and an axial channel (reference sign 88) there. Moreover, circular holes can be seen inside the additional elements 84*a*, *b* in FIG. 2. Both additional elements 84*a*, *b* are interconnected there using pins and consequently an essentially cylindrical component is produced by both additional elements 84 (see FIG. 3). A radial chamber 90 is enclosed between the radial stop contours 82 and the inner peripheral surface of the additional elements 84. Said radial chambers 90*a*, 90*b* communicate with one another via the radial channel 86. This configuration can be seen particularly in FIG. 3. The figure also shows the course of the axial channel 88, which opens out into the pump chamber 64 through a channel section 88*a* extending substantially in an axial direction and then crosses over to a peripheral section 88*b* extending virtually entirely along the outer side of the additional elements 84. At the end of said peripheral section 88*b*, the axial chamber 88 divides into two channel branches 88*c*, 88*d*, of which one channel branch 88*c* opens out into one of the first axial chambers 42*a* and the other channel branch 88*d* opens out into the other of the first axial chambers 42*b*. Thus, each of the first axial chambers 42*a*, 42*b*, on the top side of the bearing 22 is connected to the axial chamber 64 arranged on the connection side 6 via the axial channel 88.

Practical tests carried out by the applicant have shown that dividing the axial chambers provided on one top side of the bearing 22 into a plurality of independent axial chamber sections 42*a*, 42*b*, separated from one another in a circumferential direction, can improve the damping characteristics of the bearing when it is exposed to a radial stimulus. More particularly, the bearing proves to be less rigid at high frequencies. This effect can be increased even more if required by dividing the pump chamber 64 provided on the connection side accordingly. Thus, it is perfectly conceivable using partitions in a circumferential direction to divide the pump chamber into discrete segments separate from one another, which are formed as part of the intermediate diaphragm element 48 from the elastomeric material of the intermediate diaphragm element 48 and pass through the annular passage configured between said element and the bearing diaphragm element 16, as shown for example in FIG. 1. In such a case, the axial channel section 88*a* would also be divided into two channel branches and connected to the relevant individual pump chamber segments.

In the examplary embodiment shown, the individual elements are only connected by pressing them together or turning them around. More particularly, no bonded connection is provided between the elastomeric damping member 34 and the counter diaphragm element 30 and the intermediate diaphragm element 48 respectively. The connection between the intermediate diaphragm element 48 and the bearing diaphragm element 16 is not fusion bonded either, but is simply a tensionally locked connection.

The additional elements 84 restrict the radial compensating movement of the bush bearing in a manner known per se and thus serve as a radial retainer. The lower axial bump stop 18 described above restricts any wobbling movement of the axial stop plate 20 relative to the bush 2.

LIST OF REFERENCE NUMERALS

2 Bush
4 Inner part
6 Connection side
8 Abutment shoulder
10 Bearing diaphragm, axial
12 Retaining ring
14 Support lug
16 Bearing diaphragm element
18 Bump stop, axial, lower
20 Stop plate, axial
22 Top side of bearing
24 Counter diaphragm
26 Support ring
28 Retaining ring
30 Counter diaphragm element
32 Counter diaphragm abutment shoulder
34 Elastomeric damping member
35 Radial chamber wall
36 Separator
38 Partition
40 Annular channel
42 First axial chambers
44 Recess
46 Recess
48 Intermediate diaphragm element
50 Intermediate diaphragm
52 Intermediate diaphragm support ring
54 Annular disc
56 Stop element
58 Pin
60 Spacer cams
62 Inner annular surface
64 Axial chamber/pump chamber
66 Annular chamber segment
68 Connection-side front end
70 Annular chamber
72 Fluid-free damping chamber
74 Attachment region
76 Annular wall section
78 Damping segment
80 Sealing surface
82 Radial stop contour
84 Additional element
84a Additional element
84b Additional element
86 Radial channel
88 Axial channel
88a Axial channel section
88b Peripheral section
88c Channel branch
88d Channel branch
90 Radial chamber

The invention claimed is:

1. A hydraulically damping bush bearing, comprising:
an elongated inner part;
an outer bush;
an elastomeric damping member arranged between the outer bush and the inner part;
a pair of axial offset chambers defined in the bush bearing, the axial offset chambers being offset from one another in an axial direction of the inner part and communicating with one another via at least one axial channel; and
a pair of radial chambers defined in the bush bearing, the radial chambers communicating via at least one radial channel, the radial chambers being disposed between the pair of axial offset chambers and offset from each other in a circumferential direction of the inner part;
a counter diaphragm;
wherein one of the pair of axial offset chambers has at least two separated first axial chambers spaced at a distance from one another in the circumferential direction;
wherein the at least two separated first axial chambers are separated from one another by a partition formed on the elastomeric damping member; and wherein the counter diaphragm delimits the first axial chambers and rests on the partition of the elastomeric damping member in the axial direction.

2. A hydraulically damping bush bearing according to claim 1, further comprising at least one fluid-free damping chamber disposed between the pair of axial offset chambers.

3. A hydraulically damping bush bearing according to claim 2,
wherein the at least one fluid-free damping chamber extends continuously in a circumferential direction.

4. A hydraulically damping bush bearing according to claim 2, further comprising:
an intermediate diaphragm element positioned on the elastomeric damping member; and
wherein the at least one fluid-free damping chamber is delimited in part by the elastomeric damping member and in part by walls of the intermediate diaphragm element.

5. A hydraulically damping bush bearing according to claim 4,
wherein the intermediate diaphragm element has an annular chamber segment forming an annular chamber of the fluid-free damping chamber, the intermediate diaphragm element further having a damping segment attached to the elastomeric damping member in a sealing manner.

6. A hydraulically damping bush bearing according to claim 5,
wherein the intermediate diaphragm element is configured such that an inner annular wall section of the annular chamber segment is pushed onto the inner part and is fixed in an axial direction relative to the inner part such that, in an untensioned state, the damping segment projects in an offset manner relative to a front end of the annular wall section, the front end of the annular wall section being toward the elastomeric damping member.

7. A hydraulically damping bush bearing according to claim 5, wherein the elastomeric damping member is reinforced in an attachment region of a sealing surface of the damping segment with at least one reinforcing element extending substantially in an axial direction.

8. A hydraulically damping bush bearing according to claim 4,
further comprising at least one stop element connected to the intermediate diaphragm element so as to interact with the elastomeric damping member.

9. A hydraulically damping bush bearing according to claim 8,
wherein the stop element is produced as a separate component and is connected to an annular disc of the intermediate diaphragm element.

10. A hydraulically damping bush bearing according to claim 1, wherein the counter diaphragm is arranged at an axial end of the outer bush.

11. A hydraulically damping bush bearing according to claim 1, wherein the counter diaphragm lifts away from the partition when subject to excessive axial bearing pressure.

12. A hydraulically damping bush bearing comprising:
an elongated inner part;
an outer bush;
an elastomeric damping member arranged between the outer bush and the inner part;
a pair of axial offset chambers defined in the bush bearing, the axial offset chambers being offset from one another in an axial direction of the inner part and communicating with one another via at least one axial channel; and
a pair of radial chambers defined in the bush bearing, the radial chambers communicating via at least one radial channel, the radial chambers being disposed between the pair of axial offset chambers and offset from each other in a circumferential direction of the inner part;
wherein one of the pair of axial offset chambers has at least two separated first axial chambers spaced at a distance from one another in the circumferential direction;
at least one fluid-free damping chamber disposed between the pair of axial offset chambers;
an intermediate diaphragm element positioned on the elastomeric damping member; and
wherein the at least one fluid-free damping chamber is delimited in part by the elastomeric damping member and in part by walls of the intermediate diaphragm element.

* * * * *